United States Patent [19]

Cartier

[11] Patent Number: 4,575,540

[45] Date of Patent: Mar. 11, 1986

[54] POLYVINYL BUTYRAL SHEET ROUGHNESS CONTROL

[75] Inventor: George E. Cartier, Springfield, Mass.

[73] Assignee: Monsanto Company, St. Lousi, Mo.

[21] Appl. No.: 684,765

[22] Filed: Dec. 21, 1984

[51] Int. Cl.[4] .................................................. C08F 8/28
[52] U.S. Cl. ................... 525/328.7; 525/384
[58] Field of Search ..................... 525/328.7

[56] References Cited

U.S. PATENT DOCUMENTS 2,487,864  11/1949  Gaylor .
4,126,601  11/1978  Cartier ................................. 428/421
4,223,082   9/1980  Rosenfeld ............................ 430/353
4,480,072  10/1984  Mallon ................................... 525/61

*Primary Examiner*—Joseph L. Schofer
*Assistant Examiner*—Bernard Lipman
*Attorney, Agent, or Firm*—Michael J. Murphy; R. Bruce Blance; William J. Farrington

[57] ABSTRACT

Extruded polyvinyl butyral (PVB) sheet roughness is controlled by use of PVB resin lightly cross-linked through intermolecular linkages developed through use of the hydrated form of formaldehyde.

5 Claims, No Drawings

POLYVINYL BUTYRAL SHEET ROUGHNESS CONTROL

CROSS REFERENCE TO RELATED APPLICATION

"Cross-linked Polyvinyl Butyral", G. Cartier, Ser. No. 684,777, filed Dec. 21, 1984.

BACKGROUND OF THE INVENTION

This invention relates to plasticized polyvinyl butyral (PVB) sheet and more particularly to a method of regulating the surface roughness of such a sheet.

Plasticized PVB sheet is very well known as an intermediate for use with glass or plastic panels (hereinafter called "laminating panels") in laminated safety glass assemblies.

It is further known, as typically disclosed in U.S. Pat. No. 4,305,549, that the surface of the extruded sheet should have a certain degree of roughness to facilitate deairing, i.e. the evacuation of air from the interface of a PVB sheet and laminating panel during preparation of a laminate. More specifically, channels between the smooth surface of the laminating panel and the extremities of minute valleys in the face of the rough surface of the opposing, contiguous PVB sheet permit air between the two members to escape when pressure or vacuum is applied to the interface. However, since deairing is carried out differently by various laminators, different levels of sheet roughness may be required. For example if roughness is too low for a particular deairing process the air evacuation channels may close down prematurely and the edges of the sheet will seal to the laminating panel before deairing is complete. On the other hand, if the channels are too deep, it may be difficult to remove all the air before the sheet surface flattens against the laminating panel.

Different sheet roughness levels have been provided in the past by changing the surface configuration of die member(s) in the extrusion operation, but this is costly since it requires shutting down the extrusion process to change such die members. It would be desirable to provide a more tractable way to alter PVB sheet roughness.

SUMMARY OF THE INVENTION

Now improvements have been made in the manufacture of plasticized PVB sheet which minimize or overcome the aforementioned shortcomings of the prior art.

Accordingly, it is a principal object of this invention to facilitate control of extruded PVB sheet roughness by judiciously manipulating the molecular weight of the PVB from which the sheet is formed.

Another object is to manipulate such molecular weight by selective cross-linking of the PVB.

A further object is to provide lightly cross-linked PVB which, when formed into sheet, provides the desired degree of sheet roughness developed during extrusion.

Other objects of this invention will in part be obvious and will in part appear from the following description and claims.

These and other objects are accomplished by tailoring the molecular weight distribution of the PVB to provide a desired level of roughness in the extruded PVB sheet.

More specifically, there is provided a method of regulating the surface roughness of extruded, plasticized PVB sheet which comprises employing a PVB resin which is lightly cross-linked through intermolecular linkages developed through the hydrated form of formaldehyde. Roughness is preferably regulated at between about $60 \times 10^{-5}$ and about $180 \times 10^{-5}$ in (152 to $457 \times 10^{-5}$ cm).

The cross-links in the PVB are formed in conjunction with the aqueous acetalization process for forming the PVB by adding formaldehyde thereto, which, as formaldehyde hydrate, serves as the cross-linking agent.

DETAILED DESCRIPTION OF THE PREFERRED EMBODIMENTS

The PVB resin useful in the process of this invention for controlling the surface roughness of plasticized PVB sheet has the following proposed representative formula for a section of polymer chain:

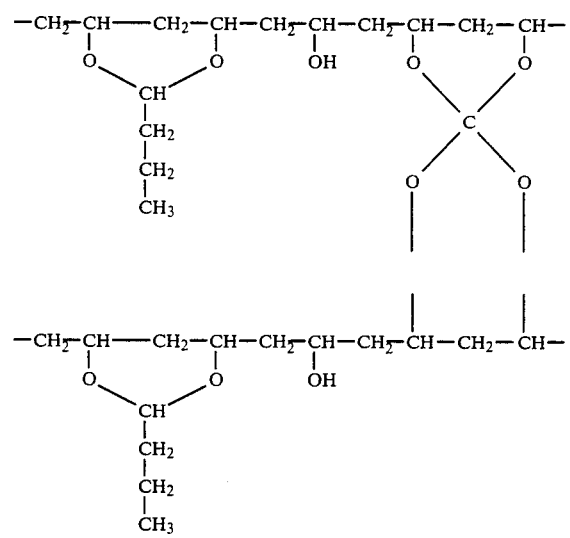

As depicted above, the polyvinyl butyral portion of the structure, which is present at a level of 65–95 wt. percent of vinyl butyral units in the polymer, is formed through reaction of butyraldehyde with two adjacent hydroxyl groups on the same PVOH chain. When acetalization takes place in an aqueous medium to which formaldehyde has been added and is therefore present as methylene glycol, i.e. HO—CH$_2$—OH, otherwise known as formaldehyde hydrate, it is thought that the individual hydroxyl groups surprisingly react as individual carbonyl groups to form two acetal groups on two different PVOH chains. In other words, the diacetal cross-linkages are formed through reaction of one hydroxyl group of the methylene glycol with a pair of adjacent OH groups on one PVOH chain and the other hydroxyl group of the methylene glycol with such a pair of hydroxyls on an adjacent, neighboring PVOH chain. Thus, it has unexpectedly been found that the pair of hydroxyls of the hydrated form of the monoaldehyde, formaldehyde, can serve as cross-linking sites to join adjacent PVOH chains. By such cross-linking, as just described, the molecular weight of the PVB is conveniently increased in that one cross-link tying together two chains provides the same molecular weight as if two equivalent PVB chains were added together end to end. The latter is thought to require a difficult synthesis of special, high molecular weight PVOH's and polyvinyl acetate precursers. Yet because such cross-linking is light (to be later defined) and does not join all PVB chains in this manner, some chains being uncross-linked and in the form of conventional PVB polymer units, the molecular weight distribution of the PVB is desirably spread.

As one of the attributes of the invention, the concentration of formaldehyde used in the cross-linking reaction can be conveniently widely varied depending on the extent of surface roughness desired in the extruded PVB sheet, and this provides a versatile chemical process tool for use in sheet fabrication. Such concentration should be adequate to lightly cross-link the PVB resin by which is meant that the viscosity of such cross-linked resin is about 2% to about 85% greater than such viscosity in the absence of the diacetal cross-linkages. Such viscosity of the lightly cross-linked PVB resin (7.5 weight % solution in methanol at 20° C.) will be between about 90 cps (0.09 Pa.s) to about 325 cps (0.325 Pa.s) and is preferably between about 150–260 cps (0.150–0.260 Pa.s). At these viscosities, the concentration of formaldehyde used (100% basis) should be between about 3 to about 15 and preferably 5 to 12 parts of formaldehyde per hundred parts of PVOH.

PVOH useful in forming the lightly cross-linked PVB for use in the process of this invention is the product of the acid or base catalyzed hydrolysis of a polyvinyl ester (usually polyvinyl acetate) which is suitable for the production of PVB by condensation with butyraldehyde. Such PVOH comprises products of a substantially complete as well as incomplete hydrolysis, the latter including those where hydrolysis is purposely stopped short of completion. PVB resin made from such products of incomplete hydrolysis differ in the residual content of polyvinyl ester. Useful PVOH can contain residues of unhydrolyzed vinyl ester in their molecules in amounts up to 5% by weight (calculated as polyvinyl acetate), although amounts on the order of about 0 to 2.5% by weight of polyvinyl acetate are preferred when the PVB resin is to be used in making interlayer sheeting for safety glass. Blends of individual PVOH grades of different viscosities can be and are preferably used. By selecting specific blend components, the melt viscosity of the PVB (and therefore the modulus of the resulting PVB sheet) can be kept reasonably constant to provide optimum downstream sheet properties while roughness is controlled by the cross-linking of this invention.

Lightly cross-linked PVB resin for use in this invention is produced by the known aqueous acetalization process wherein the PVOH hydrolysis product is reacted with butyraldehyde in the presence of an acid catalyst to produce PVB, followed by neutralization of the catalyst, separation, stabilization and drying of the PVB resin. The formaldehyde can be added to the catalyzed condensation reaction mixture before or simultaneously with the butyraldehyde. More specifically, acetalization and cross-linking are carried out by adding butyraldehyde and formaldehyde to a water solution of PVOH at a temperature on the order of about 20° C., in the presence of an acid catalyst, agitating the mixture to cause an intermediate PVB to precipitate in finely divided form and continuing the agitation while heating until the reaction mixture has proceeded to the desired end point.

Because of the relationship herein recognized between surface roughness of the extruded interlayer sheet and the polydispersity or molecular weight distribution of the PVB of such sheet achieved through light cross-linking of such PVB, roughness can be controlled and conveniently tailored by adjusting the extent of such cross-linking through the concentration of the formaldehyde used. For example, if the molecular weight distribution (MWD) of the PVB resin for forming the sheet is too narrow, the surface roughness of the extruded interlayer will be too high, whereas if the reverse is true and such molecular weight distribution is too broad, the extruded sheet roughness will be too low and complete deairing may not be feasible. This invention provides a chemical means for adjusting sheet surface roughness. This is achieved by lightly cross-linking the PVB resin to broaden the molecular weight distribution thereof which, after plasticization and extrusion, produces an interlayer sheet of desired roughness level which can be further subsequently adjusted by judiciously adjusting the concentration of formaldehyde used in association with the acetelization reaction. MWD is measured by the ratio $\overline{M}_w/\overline{M}_n$ where $\overline{M}_w$ is the weight average molecular weight and $\overline{M}_n$ is the number average molecular weight.

The lightly cross-linked PVB resins of the invention have Staudinger molecular weights ranging from about 30,000 to 600,000 and preferably from 45,000 to 270,000 and may be considered to be made up on a weight basis, of from 5 to 30% hydroxyl groups, calculated as polyvinyl alcohol, 0 to 5% ester groups, calculated as polyvinyl ester, and the balance substantially butyral groups. The PVB resin preferably contains, on a weight basis, from 11 to 25% hydroxyl groups, calculated as polyvinyl alcohol, and from 0 to 2.5% acetate groups, calculated as polyvinyl acetate, the balance being substantially butyral groups. The extent of cross-linking is so low in the present invention that the effect on the residual hydroxyl content of the PVB resin cannot presently be measured.

The melt viscosity of the lightly cross-linked PVB resin at 120° C. will be between about $2 \times 10^5$ and about $3.5 \times 10^5$ poise (0.2 to $0.35 \times 10^5$ Pa.s) and preferably between about 2.50 and about $3.05 \times 10^5$ poise (0.250 and $0.305 \times 10^5$ Pa.s). When sheet roughness is in the form of a multitude of minute peaks and valleys in one or both surfaces it can be characterized by an average value of between about 60 to about $180 \times 10^{-5}$ inch (152 to $452 \times 10^{-5}$ cm) and preferably between about 120 to about $150 \times 10^{-5}$ inch (305 to $381 \times 10^{-5}$ cm) for the depths of individual valleys in a representative area of the sheet. A device for measuring such depths is described hereinafter.

In forming the extruded interlayer sheet, the lightly cross-linked PVB resin must be plasticized with from about 20 to 80 parts plasticizer per hundred parts of resin and more commonly between 25 and 45 parts for normal laminated safety glass use. This latter concentration is generally used with polyvinyl butyrals containing 17 to 25% vinyl alcohol by weight. In general, plasticizers commonly employed are esters of a polybasic acid or a polyhydric alcohol. Particularly suitable plasticizers are triethylene glycol di-(2-ethyl butyrate), dihexyl adipate, dioctyl adipate, mixtures of heptyl and nonyl adipates, dibutyl sebacate, polymeric plasticizers such as the oil-modified sebacid alkyds, and mixtures of phosphates and adipates such as are disclosed in U.S. Pat. No. 3,841,890 and adipates and alkyl benzyl phthalates such as disclosed in U.S. Pat. No. 4,144,217. Other suitable plasticizers are well known or will be obvious to those skilled in the art.

The extruded interlayer formed from plasticized, lightly cross-linked PVB resin according to this invention can be prepared by extrusion through a sheeting die having water-cooled die lips, i.e. forcing molten polymer through a long narrow die opening substantially conforming in length and width to that of the sheet being formed therein or by casting the molten polymer issuing from an extrusion die onto a specially prepared surface of a die roll positioned in close proximity to the exit of such die which imparts the desired surface characteristics to one side of the molten polymer. Thus, when the surface of such roll has minute peaks and valleys, sheet formed of polymer cast thereon will have a rough surface on the side which contacts the roll which generally conforms respectively to the valleys and peaks of the roll surface. Further details of construction of such a die roll are disclosed in U.S. Pat. No. 4,035,549, col. 3, line 46 through col. 4, line 44, the content of which is incorporated herein by reference.

A rough surface on the other side of the extruded interlayer formed in a die roll extrusion system can be provided by the design of the die opening through which the extrudate passes. Such a die opening configuration is generally shown in FIG. 4 of U.S. Pat. No. 4,281,980, the content of such figure being incorporated herein by reference. When the outermost end portion of die lip 5 in such figure in the direction of extrusion is parallel with a tangent to the surface of the opposing rotating die roll, and the remaining rearward portion of such lip is at an angle of between about 2 to 7 degrees with such tangent, a rough surface will automatically be generated on the side of the extruded interlayer which is opposite to that formed by the die roll surface.

In addition to plasticizers, interlayers according to this invention may contain other additives such as dyes, ultraviolet light stabilizers, antioxidants, salts to control adhesion and may, if desired, be treated with additives to improve laminating efficiency.

The following procedures were used in obtaining the values for the various properties presented in Table 1 following:

Number average molecular weight ($\overline{M}_n$) and weight average molecular weight ($\overline{M}_w$) of PVB by size exclusion chromatography with low angle laser light scattering in 0.005M NaNO$_3$ aqueous solution. This procedure is more fully disclosed in a paper by A. C. Ouano and W. Kaye in Journal of Polymer Science, Polymer Chemistry Edition, Vol. 12 (1974), page 1151. $\overline{M}_n$ and $\overline{M}_w$ values for PVB were measured by gas phase chromatography with low angle laser light scattering in a solution of tetrahydrofuran (10 mg of PVB per milliliter of THF). Further information is in Polymer Preprints, Vol. 23 (1982), page 35 in a paper by P. Metzger Cotts and A. C. Ouano.

Melt or complex viscosity of the plasticized lightly cross-linked PVB with a Rheometric Mechanical Spectrometer at a frequency of 6.3 radians/sec. The sample was placed between two parallel plates oscillating at such frequency.

Viscosity by a capillary tube viscometer-Cannon Fenske #400.

Extruded interlayer roughness ($R_z$) with a profilometer such as Model C59 Perthometer from Mahr Gage Co., N.Y. $R_z$ is obtained directly by moving the stylus back and forth across the rough surface and constitutes an average value of the individual roughness depts in five sequential measuring lengths $l_e$ of 0.8 mm.

The invention is further described with reference to the following examples which are for illustration only and are not intended to imply any limitation or restriction on the invention. Unless otherwise indicated, all quantities are expressed by weight.

EXAMPLES 1-2

Polyvinyl alcohol (PVOH) resin having a residual polyvinyl acetate content of less than 2% was dissolved with agitation in water at 90°-95° C. to form an 8% solution, 5524 kg of this PVOH solution was charged to an agitated, reactor and its temperature adjusted to 18° C. To this solution was added 267 kg of butyraldehyde and 89.8 kg of 50% formaldehyde which decreased the temperature to about 16° C. Water (400 kg) and nitric acid (16 kg of 35% water solution) were then charged and the mixture held for 1.25 h at between 16° and 20° C. A second charge of 46.5 kg of nitric acid was added 1 h after the initial nitric acid charge. After 1.25 h the mixture was heated over 2 h to 75° C. and held thereat for 2.5 h. The contents of the reactor was transferred to an agitated hold tank and washed with water at 75° C. to a pH of 4.0. Potassium hydroxide water solution was then charged to provide a pH of 9.5-10.5 and the contents held at this pH for 3 h at 75° C. Additional water at 75° C. was then added to decrease the pH to 7.5. The PVB slurry was centrifuged and dried to less than 2% moisture. The viscosity and molecular weight distribution of the dried PVB resin was measured and the following results were obtained:

TABLE 1

| Ex. | 50% Formaldehyde charged (kg) | PVB Viscosity (cps) (Pa · s) | PVB MWD[1] |
|---|---|---|---|
| 1 | 0 | (175) (0.175) | 2.14 |
| 2 | 89.8 | (269) (0.269) | 2.62 |

[1]MWD = Molecular Weight Distribution = $\overline{M}_w/\overline{M}_n$

The foregoing results in Table 1 illustrate the preparation of PVB lightly cross-linked through intermolecular linkages achieved through the presence of formaldehyde hydrate formed from 10 parts of formaldehyde (100%) per hundred parts of PVOH as the cross-linking agent in the aqueous acetalization of PVOH with butyraldehyde. That cross-linking occurred is shown by the 54% increase in the viscosity of the PVB that occurred when the formaldehyde was used in Example 2 in comparison with that of control Example 1. The higher value for MWD in Example 2 in comparison with Example 1 indicates a broadening of the molecular weight distribution of the PVB as a result of diacetal intermolecular cross-links provided through use of the formaldehyde.

EXAMPLES 3 and 4

These examples illustrate preparation of a plasticized sheet made from the lightly cross-linked PVB of Example 2.

32 parts of dihexyl adipate plasticizer were mixed with 100 parts of the cross linked PVB resin of Examples 1 and 2 in a high intensity mixer. The plasticized PVB resin was then melted in an extruder and forced in melt form through a die opening onto the surface of an adjacent rotating die roll of the type previously described which had internal cooling means which regulated the temperature of a die blade in contact with the polymer melt at about 104° C. The melt was at 190° C. and the pressure at the die was 2411-2756 kPa. The extruded sheet had a thickness of about 0.8 mm and issued from the die roll at about 4.5 m per minute. The die lip of the die opening as previously described was formed with a compression angle of about 4 degrees. Each side of the extruded sheet was formed with a rough surface. The roughness of the side opposite that in contact with the die roll was measured and the result obtained along with the melt viscosity of the PVB resin are tabulated in Table 2.

TABLE 2

| Ex. | Formaldehyde Used In Making PVB Wt/per cwt of PVOH | Sheet Surface Roughness ($R_z$) (cm) (in) ($\times 10^{-5}$) | Melt Viscosity @ 120° C. (p) (Pa · s) ($\times 10^{-5}$) |
|---|---|---|---|
| 3 | 0 | (889) (350) | (2.80) (0.280) |
| 4 | 8.65 | (254) (100) | (2.87) (0.287) |

The foregoing results in Table 2 illustrate preparation of plasticized PVB sheet lightly cross-linked through diacetal intermolecular linkages achieved through the presence of formaldehyde hydrate as the cross-linking agent in forming the PVB from which the sheet was formed. That the cross-links survived the extrusion operation in forming the sheet from the melt is shown by the increased melt viscosity levels obtained with the cross-linked PVB (Example 4) in comparison with the uncrosslinked control of (Example 3).

Also illustrated is the method of the invention for regulating the surface roughness of the extruded, plasticized PVB sheet. Using the lightly cross-linked PVB of Example 4 dramatically and unexpectedly drastically reduced the sheet roughness level by 71.4% from that of Example 3 made using uncrosslinked PVB, yet without any significant change in the desirable melt viscosity level.

The preceding description is set forth for purposes of illustration only and is not to be taken in a limited sense. Various modifications and alterations will be readily suggested to persons skilled in the art. It is intended, therefore, that the foregoing be considered as exemplary only and that the scope of the invention be ascertained from the following claims.

I claim:

1. A method of regulating the surface roughness of extruded, plasticized PVB sheet which comprises: employing during extrusion a PVB resin lightly cross-linked prior to extrusion through intermolecular linkages developed through the hydrated form of formaldehyde, said sheet having a surface roughness less than that which would be present in the absence of such linkages.

2. The method of claim 1 wherein the PVB resin employed has, after plasticization, a melt viscosity at 120° C. of between about $2.0 \times 10^5$ and about $3.5 \times 10^5$ poise.

3. The method of claim 2 wherein the roughness is determined by a value of about $60 \times 10^{-5}$ to about $180 \times 10^{-5}$ inch.

4. The method of claim 3 wherein said roughness is determined by a value of about $120 \times 10^{-5}$ to $150 \times 10^{-5}$ inch.

5. The method of claim 1, 2, 3 or 4 wherein the PVB before plasticization had a viscosity about 2% to about 85% greater than its viscosity in the absence of such linkages.

* * * * *